United States Patent [19]

Matsumura

[11] Patent Number: 4,713,987

[45] Date of Patent: Dec. 22, 1987

[54] REDUCTION RATIO CONTROL FOR CONTINUOUSLY VARIABLE TRANSMISSION

[75] Inventor: Toshio Matsumura, Yokosuka, Japan

[73] Assignee: Nisson Motor Co., Ltd., Yokohama, Japan

[21] Appl. No.: 603,311

[22] Filed: Apr. 24, 1984

[30] Foreign Application Priority Data

May 27, 1983 [JP] Japan ................... 58-92415

[51] Int. Cl.⁴ ............................................. B60K 41/16
[52] U.S. Cl. ............................. 74/866; 74/844; 74/878
[58] Field of Search ................ 74/844, 863, 878, 866

[56] References Cited

U.S. PATENT DOCUMENTS

| | | | |
|---|---|---|---|
| 3,283,603 | 11/1966 | Kuiper | 74/472 |
| 4,397,379 | 8/1983 | Baudoin | 74/866 X |
| 4,458,560 | 7/1984 | Frank et al. | 74/863 X |
| 4,507,986 | 4/1985 | Okamura et al. | 74/866 |
| 4,515,041 | 5/1985 | Frank et al. | 74/866 |
| 4,566,354 | 1/1986 | Kumura et al. | 74/866 |

FOREIGN PATENT DOCUMENTS

| | | |
|---|---|---|
| 0061736 | 10/1982 | European Pat. Off. . |
| 0061735 | 10/1982 | European Pat. Off. . |
| 0061732 | 10/1982 | European Pat. Off. . |
| 0061733 | 10/1982 | European Pat. Off. . |
| 0061734 | 10/1982 | European Pat. Off. . |
| 73475 | 3/1983 | European Pat. Off. .............. 74/866 |
| 55-08939 | 1/1980 | Japan ................................ 74/866 |
| 57-161359 | 10/1982 | Japan . |
| 57-161362 | 10/1982 | Japan . |
| 57-161346 | 10/1982 | Japan . |
| 58-88252 | 5/1983 | Japan ................................ 74/866 |
| 2030661 | 4/1980 | United Kingdom . |

*Primary Examiner*—Leslie Braun
*Assistant Examiner*—Joseph M. Rolnicki
*Attorney, Agent, or Firm*—Schwartz, Jeffery, Schwaab, Mack, Blumenthal & Evans

[57] ABSTRACT

A control is disclosed wherein an engine coolant temperature or an idle engine speed is sensed and the minimum desired reduction ratio is limited based on the sensed result, thus preventing an engine from vibrating or stalling.

2 Claims, 10 Drawing Figures

REDUCTION RATIO CONTROL FOR CONTINUOUSLY VARIABLE TRANSMISSION

BACKGROUND OF THE INVENTION

The present invention relates to a control for controlling a reduction ratio in a continuously variable transmission.

In controlling a reduction ratio in a continuously variable transmission of a vehicle having an engine, a vehicle speed, an engine speed and a throttle opening are sensed or detected and a desired reduction ratio is so determined based on the sensed results as to operate the engine in a predetermined desired operating state thereof. However, if the reduction ratio in the continuously variable transmission is controlled in the same shift schedule or pattern; a problem is posed when the engine operation is irregular during engine start-up and the subsequent warming up period where the engine temperature is low. The problem is in that the engine cannot produce power high enough to meet the demand, the engine vibrates unplesantly and the engine stalls.

One proposal to alleviate the above problem is described in a co-pending U.S. Patent Application Ser. No. 486,331 filed Apr. 19, 1983 which has been commonly assigned herewith (corresponding to European Patent Application No. 83103773.4 filed Apr. 19, 1983). According to this known control idea, when the engine coolant temperature is lower than a predetermined value, the sensed vehicle speed or engine speed or throttle operating condition is corrected so as to increase the desired reduction ratio toward the larger reduction ratio side in accordance with the degree to which the engine coolant temperature drops below the predetermined value, thus increasing the engine speed. This control strategy, however, is not satisfactory in solving the above mentioned problem because there still remains a possibility that the transmission is set to a minimum reduction ratio which is an achievable limit on account of the construction of the transmission when the vehicle plunges into a certain operating condition. Therefore, even with this known control, the above mentioned problem is not solved although it is somewhat alleviated.

SUMMARY OF THE INVENTION

According to the present invention, the minimum desired reduction ratio is limited during a predetermined operating condition where an engine tends to operate irregularly, i.e., for example during start-up and subsequent warming-up period. The minimum desired reduction ratio is variable with a variation in engine coolant temperature or engine idle speed.

An object of the present invention is to provide a control for controlling a reduction ratio in a continuously variable transmission whereby the transmission is prevented from establishing a reduction ratio near the minimum reduction ratio achievable with the construction of the transmission during an operating condition where the engine tends to operate irregularly so as to prevent the engine from vibrating or stalling.

DETAILED DESCRIPTION OF THE INVENTION

Referring to FIGS. 1 to 6, a first embodiment according to the present invention is described.

Figure 1:
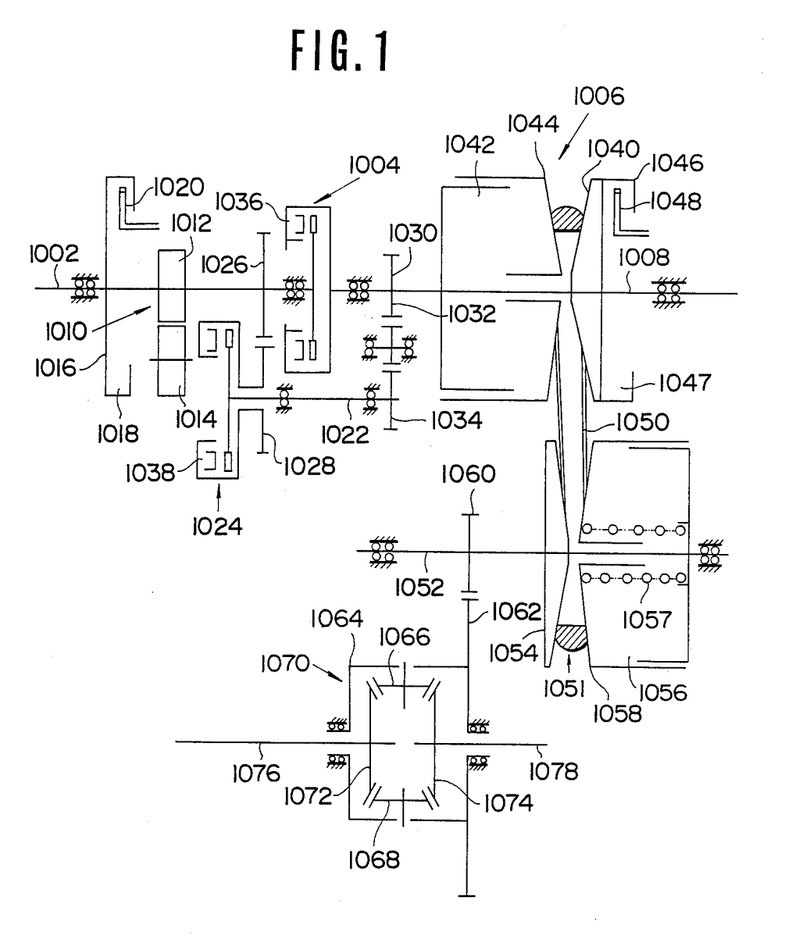
FIG. 1 is a schematic diagram of a transmission mechanism of a continuously variable transmission.
Figure 2A:
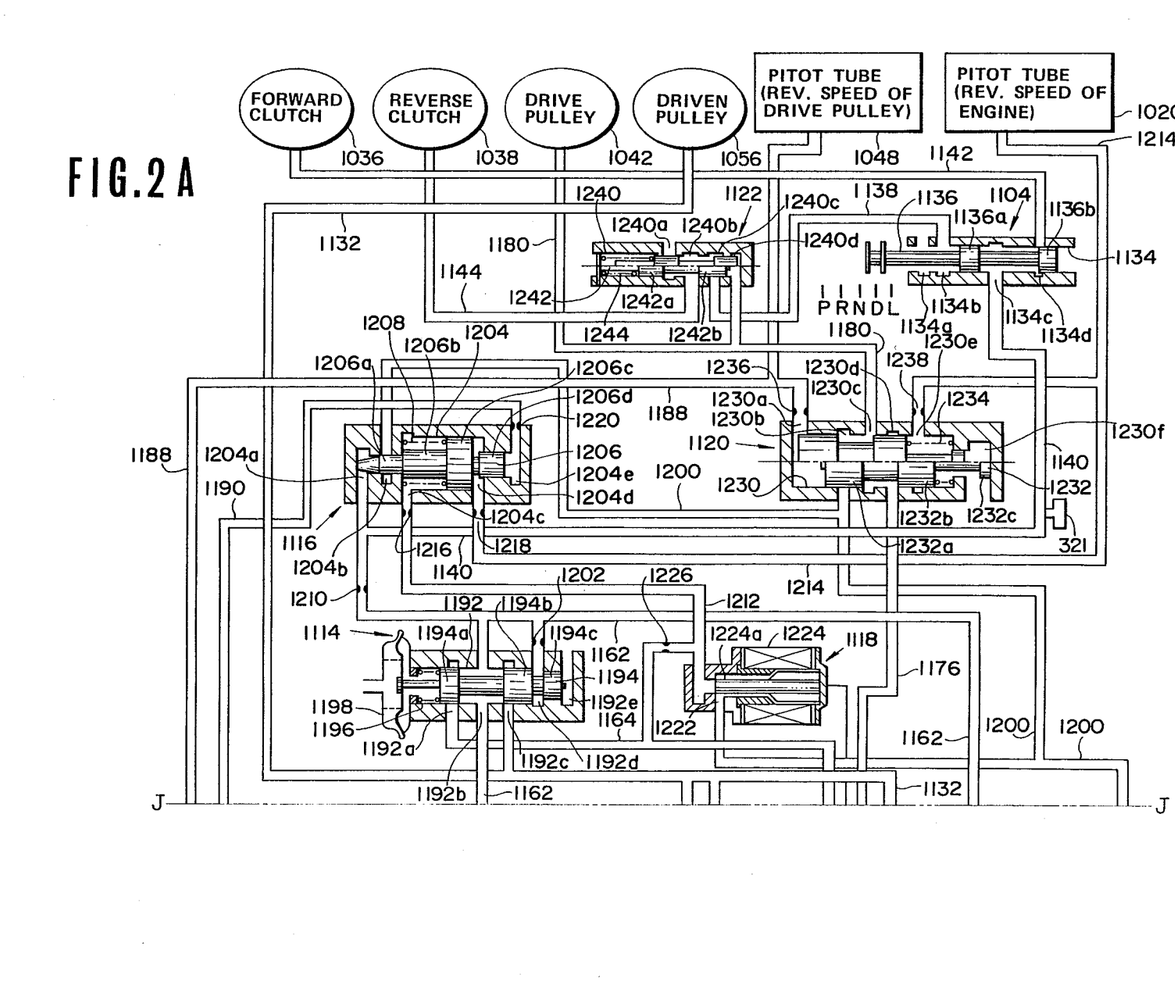
FIGS. 2A and 2B, when combined, illustrate a hydraulic control system for the continuously variable transmission.
Figure 2B:
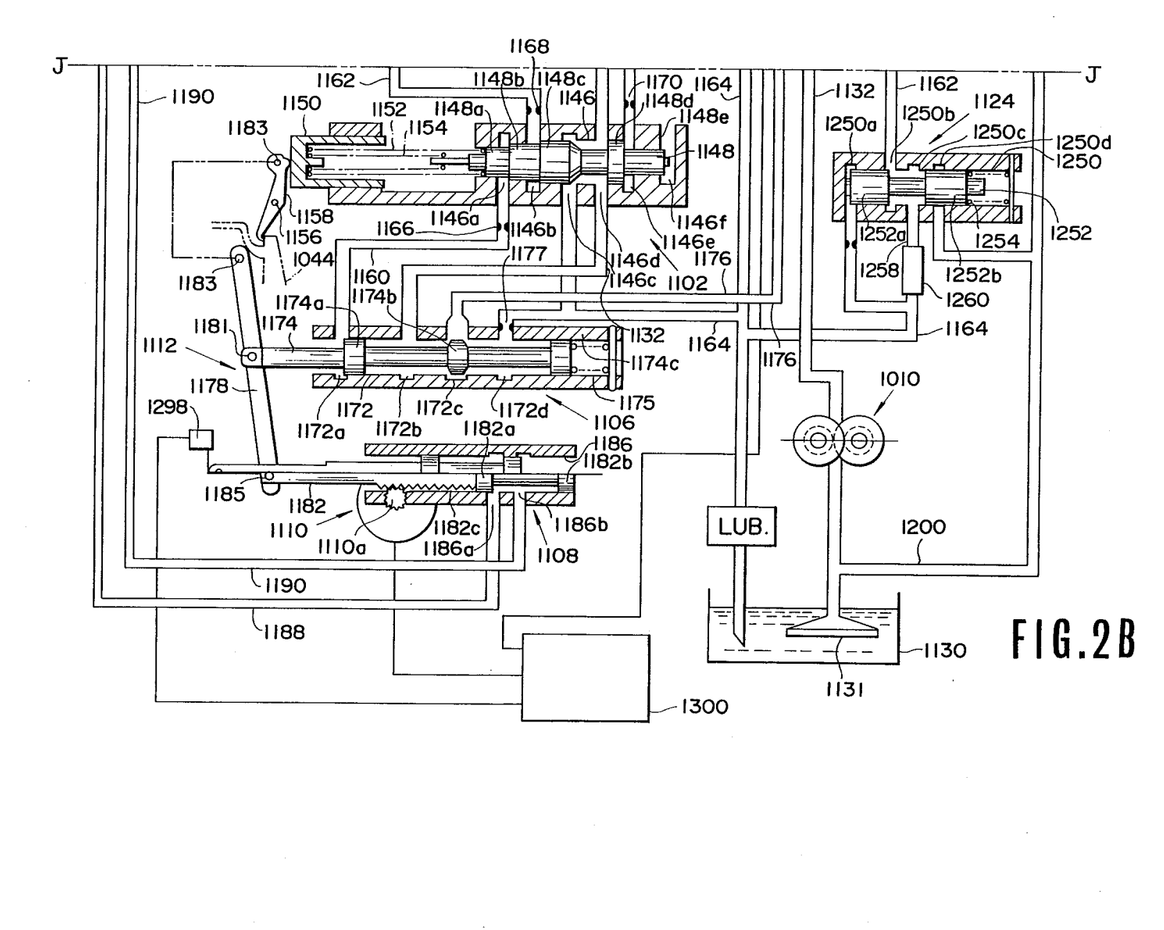

Referring to FIGS. 1 and 2A, 2B, a power transmission mechanism of a continuously variable transmission and a control system thereof are shown. The power transmission mechanism and the control system are described in a co-pending U.S. patent application Ser. No. 543,838, filed Oct. 20, 1983 (see FIGS. 1, 2A and 2B) and commonly assigned herewith, which corresponds to a European Patent Application No. 83110546.5 filed Oct. 21, 1983, the disclosure of which application is hereby incorporated by reference in its entirety.

Figure 3:
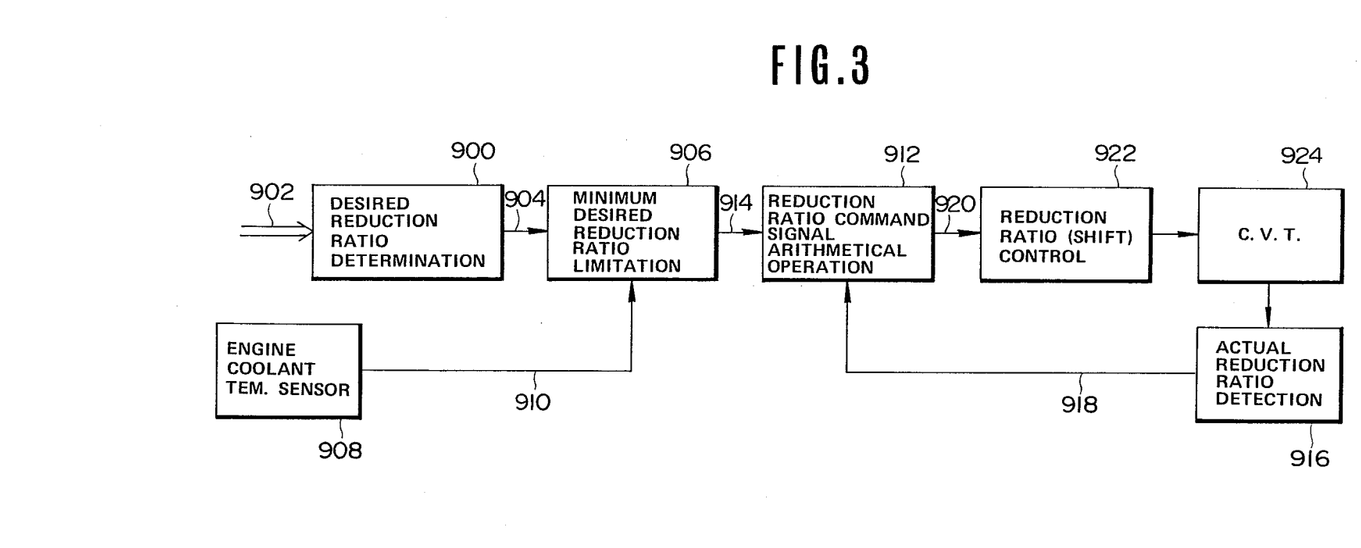
FIG. 3 is a block diagram illustrating a first embodiment of a control strategy in reduction ratio of the continuously variable transmission according to the present invention.

Referring to FIG. 3, a control strategy carried out by a control unit 1300 is described.

Fed to a desired reduction ratio determinig block 900 are operating state indicative signals 902 expressing the operating state of a vehicle, such as a vehicle speed, a throttle opening degree, an engine speed. The desired reduction ratio determining block 900 determines a desired reduction ratio based on the operating state indicative signals 902. The desired reduction ratio is set such that if the reduction ratio in the continuously variable transmission is adjusted to the desired reduction ratio, the engine operates in an operating state which requires the least or minimum fuel consumption. A desired reduction ratio signal 904 indicative of the desired reduction ratio is generated by the block 900 and fed to a desired reduction ratio minimum value limiting block 906. Also fed to the desired reduction ratio minimum value limiting block 906 is an engine coolant temperature signal 910 from an engine coolant temperature sensor 908. With the desired reduction ratio minimum value limiting block 906, the desired reduction ratio 904 is allowed to be sent to a shift command signal arithmetical operation block 912 as it is when the engine coolant temperature is higher than a predetermined value, but when the engine coolant temperature is lower than the predetermined value, the desired reduction ratio signal 904 is limited, as will be described later, such that the minimum value of the desired reduction ratio does not become lower than a predetermined value and thereafter sent to the shift command signal arithmetical operation block 912. In the shift command signal arithmetical operation block 912, a deviation between the signal 914 from the desired reduction ratio minimum value limiting block 906 and an actual reduction ratio signal 918 indicative of an actual reduction ratio from an actual reduction ratio detecting block 916 is obtained by arithmetical operation, and in order to reduce the deviation toward zero, a reduction ratio command signal 920 is provided to a shift control mechanism 922. The shift control mechanism 922 is actuated based on the shift command signal 920 so as to control the reduction ratio in the continuously variable transmission 924. The actual reduction ratio is obtained in the actual reduction ratio detecting block 916.

Figure 4:
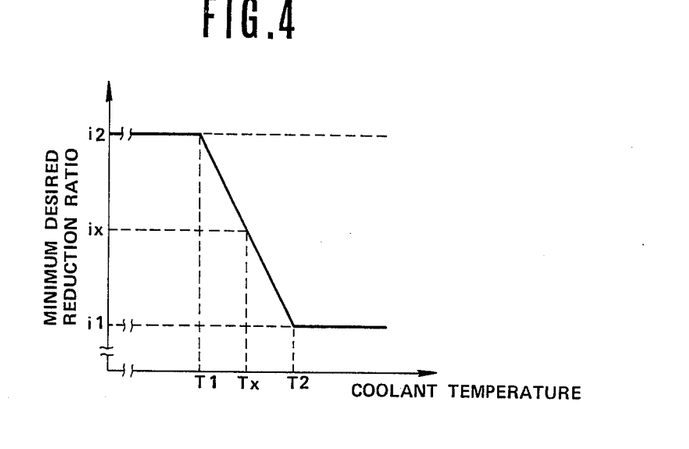
FIG. 4 shows a characteristic of variation of a minimum value of desired reduction ratios versus a coolant temperature of an engine.

FIG. 4 shows a characteristic of variation of the minimum value of the desired reduction ratio versus engine coolant temperature, which characteristic is set in the desired reduction ratio minimum value limiting block 906. The minimum value of the desired reduction ratio is set to a value equal to the minimum reduction ratio i1 that is achievable with or allowed by the construction of the transmission when the engine coolant temperature is higher than T2 (for example, 80° C.). In this case, the range where the reduction ratio can be selected is not restrained, thus allowing usual reduction ratio control. On the other hand, when the engine coolant temperature is lower than T1 (for example 20° C.), the minimum value of the reduction ratio is set to the maximum reduction ratio i2 that is achievable with or allowed by the construction of the transmission. In this case, what is fed to the reduction ratio command signal arithmetical operation block 912 is a signal that commands the reduction ratio i2, thus prohibiting the selection of any reduction ratio but the reduction ratio i2. When the engine coolant temperature is Tx which is between T1 and T2, the minimum value of the reduction ratio is set to a value which varies in accordance with Tx as illustrated. In this case, the reduction ratio is allowed to take a value between the reduction ratio i2 and ix. Therefore, since the reduction ratio does not become smaller than ix, the engine speed is maintained relatively high, thus preventing the occurrence of engine vibration or engine stall.

The control strategy described thus far is hereinafter described in detail referring to the flowchart shown in FIG. 5.

Figure 5:
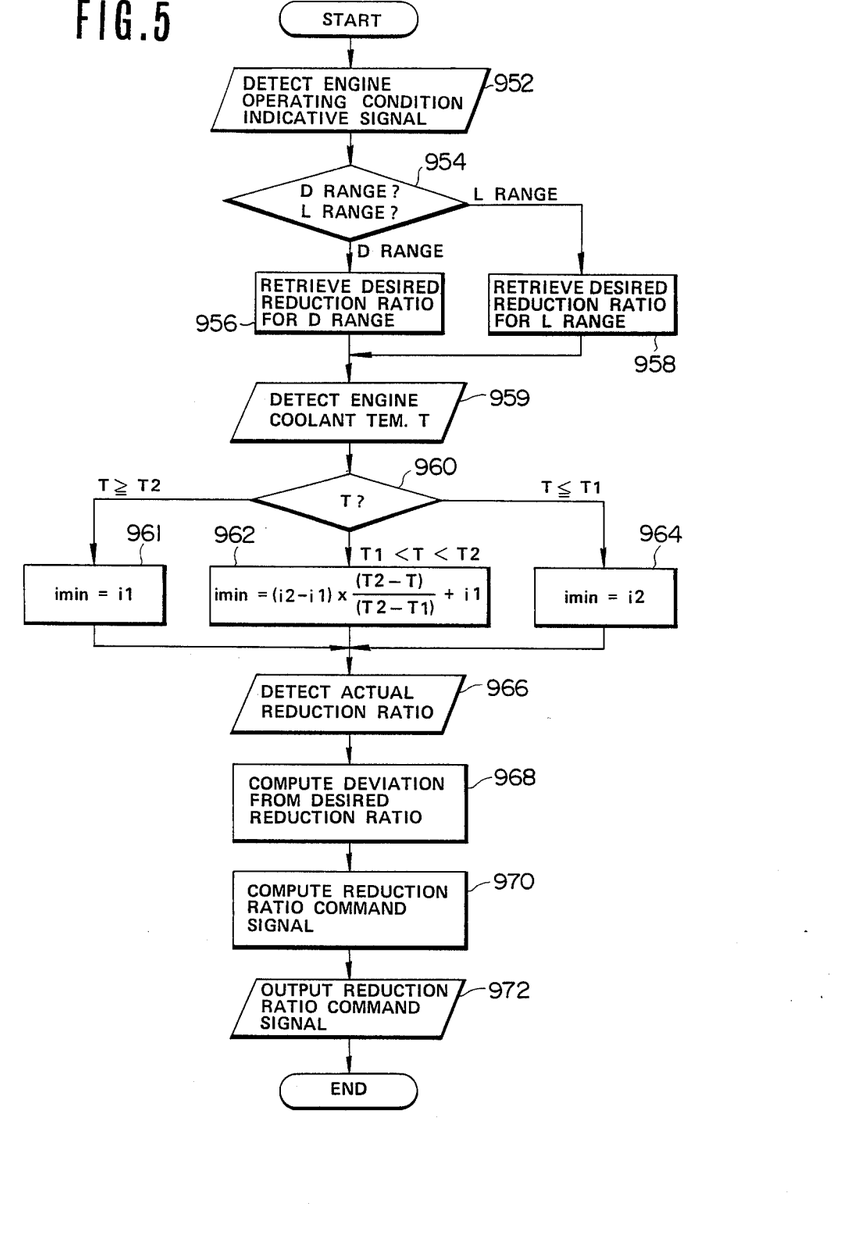
FIG. 5 is a flowchart for the control strategy shown in FIG. 3.

Referring to FIG. 5, a signal indicative of the operating state of the vehicle is detected (in step 952), a determination is made whether the shift lever is set to D range or L range (in step 954), the desired reduction ratio for the D range is retrieved when the shift lever is in the D range (in step 956), and the desired reduction ratio for the L range is retrieved when the shift lever is in the L range (in step 958). The engine coolant temperature T is detected (in a step 959). In a step 960, if the engine coolant temperature T is higher than T2, the minimum value imin of the reduction ratio is given the value i1 (in a step 961) before going to a step 966. If the engine coolant temperature T is between T1 and T2, the minimum value imin of the desired reduction ratio is given by $i1+((T2-T)/(T2-T1))\times(i2-i1)$ (in a step 962) before going to the step 966. If the engine coolant temperature T is lower than T1 the minimum value imin of the reduction ratio is given i2 (in a step 964) before going to the step 966. In the step 966, the actual reduction ratio is detected, and the deviation between the desired reduction ratio and the actual reduction ratio is determined by arithmetical operation (in a step 968).

Figure 6:
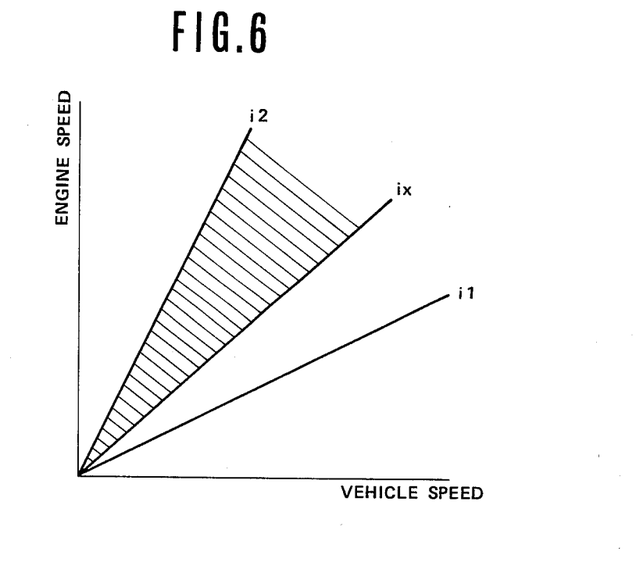
FIG. 6 is a shift schedule diagram.

Then, the arithmetical operation is performed to determine a reduction ratio command signal (in a step 970) and the determined reduction ratio command signal is provided to the reduction ratio control mechanism (in a step 972). With the control procedure along the flowchart as above, the minimum value of the reduction ratio is set or limited in the above described manner. If the limiting of the minimum value in the desired reduction ratio is expressed in terms of reduction ratio lines, it can be expressed as shown in FIG. 6. That is, in the usual state, all of the reduction ratios falling in the range between the maximum reduction ratio i2 and the minimum reduction ratio i1 which are achievable with the construction of the continuously variable transmission may be used, but when the engine coolant temperature is low, the reduction ratios falling in the range, as shown by the hatched area, between the reduction ratio ix and the reduction ratio i2 only are allowed. Therefore, the actual reduction ratio cannot approach the minimum reduction ratio i1 that is achievable with the construction of the transmission whenever the engine coolant temperature is low regardless of any operating state where the vehicle is operating.

Figure 7:
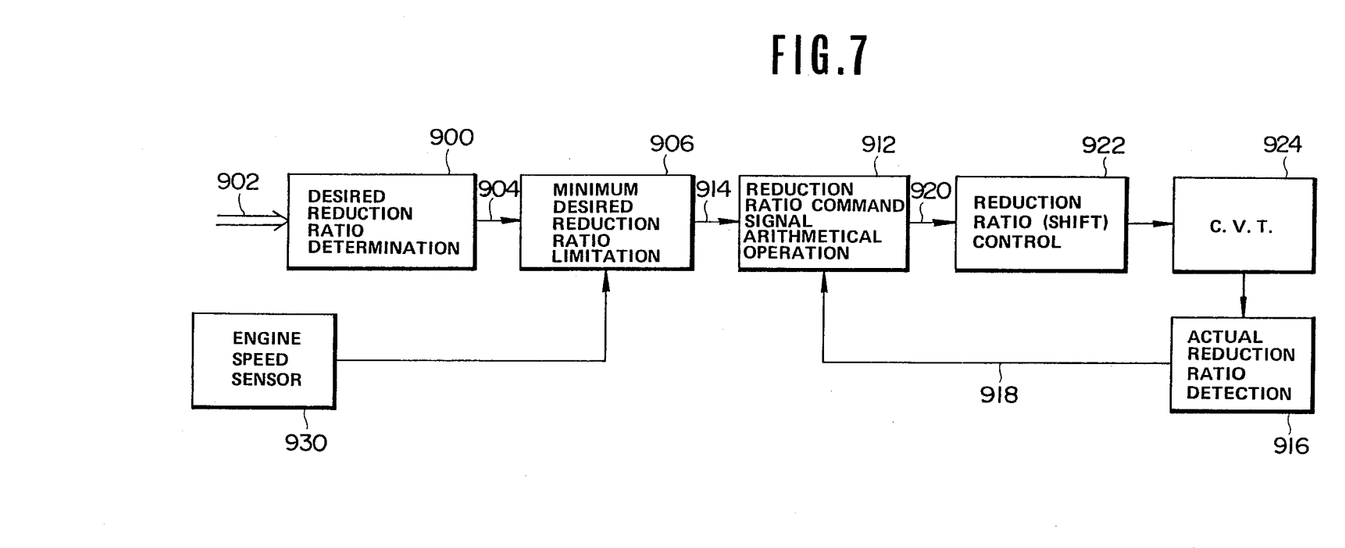
FIG. 7 is a block diagram similar to FIG. 3 showing a second embodiment according to the present invention.
Figure 8:
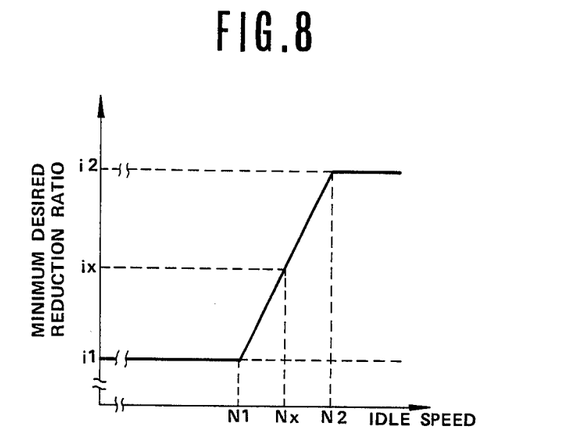
FIG. 8 is a similar view to FIG. 4 showing a characteristic, used in the second embodiment, of variation of a minimum value of desired reduction ratios versus an idle engine speed.
Figure 9:
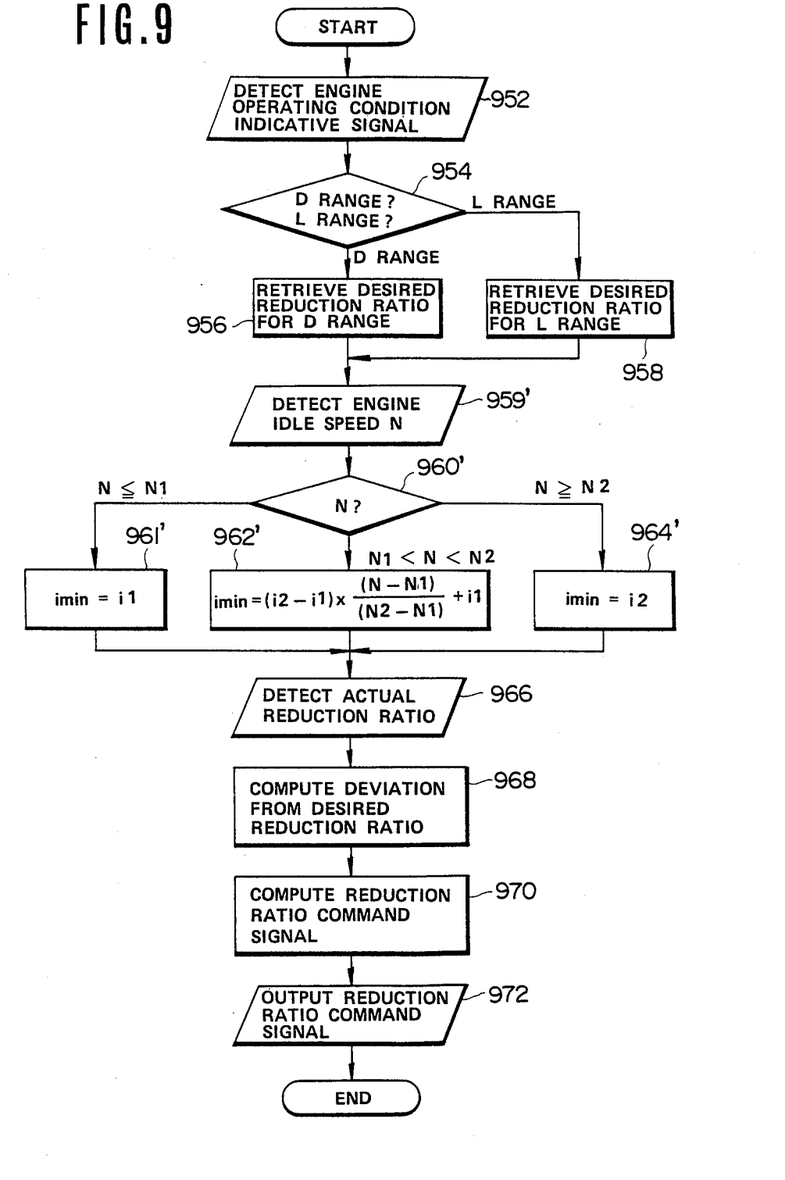
FIG. 9 is a flowchart for the second embodiment according to the present invention.

Referring to FIGS. 7 to 9, a second embodiment according to the present invention is described. This embodiment is different from the first embodiment in that instead of sensing the engine coolant temperature, the engine idle speed is sensed to detect an operating condition where the engine tends to operate irregularly. Thus, the engine coolant temperature sensor 908 has been replaced with an engine speed sensor 930 in this embodiment and the sensor signal from the engine speed sensor 930 is used for the control procedure.

During engine start-up, the idle speed is higher than the normal owing to the fast idle function by the choke. This is used to set the minimum value of the desired reduction ratio. That is, the minimum value of the desired reduction ratio having a characteristic as shown in FIG. 8 is set. The idle speed N1 represents the usual idle speed after warming-up and in this case all of the range of the reduction ratio of the continuously variable transmission may be used, thus permitting the usual reduction ratio control to be effected. If the engine idle speed is higher than N2, the minimum value of the desired reduction ratio is set to a value i2 and the reduction ratio is fixed to this value. If the engine idle speed Nx is between N1 and N2, the minimum value of the desired reduction ratio is set to a value ix, thus allowing the reduction ratio control to be effected between the value i2 and the value ix. The flowchart is shown in FIG. 9.

Referring to FIG. 9, the flowchart illustrated therein is substantially similar to the flowchart shown in FIG. 5 except that the steps 959, 960, 961, 962 and 964 are replaced with similar steps 959', 960', 961', 962' and 964'. In these steps, based on the sensed engine idle speed N, the minimum value imin is set.

Although, in the above mentioned first and second embodiments, the desired reduction ratio is determined by the desired reduction ratio determining block and thereafter the minimum value thereof is limited, it may be effected in the stage of detecting the desired reduction ratio to determine the desired reduction ratio in a manner not to become lower than the predetermined value. That is, for example, a plurality patterns of desired reduction ratios are stored, and retrieval is carried out to select an appropriate one of the patterns in response to the engine coolant temperature. What is only necessary is to design the pattern to be selected when the engine coolant temperature is low such that the desired reduction ratio does not drop below the predetermined value.

In addition to limiting the minimum value of the desired reduction ratio according to the present invention described above, it may be possible to correct the throttle opening degree signal, vehicle speed signal, desired engine speed signal or desired reduction ratio command signal using the measure similar to that disclosed in the before mentioned U.S. patent application Ser. No. 486,331. In this case, in addition to limiting the use of reduction ratio within the low reduction ratio range, the engine speed is elevated even within the actually usable reduction ratio range, thus more effectively solving the above mentioned problem.

I claim:

1. A control for controlling a reduction ratio in a continuously variable transmission of a vehicle having an engine drivingly connected to the continuously variable transmission, the control comprising:

means for determining a desired reduction ratio within a predetermined reduction ratio range and generating a desired reduction ratio indicative signal;

sensor means for sensing engine temperature of the engine and generating a sensor signal indicative of said engine temperature;

means responsive to said sensor signal for determining a minimum reduction ratio within a minimum reduction ratio range based on possible values of said engine temperature and generating a minimum reduction ratio indicative signal, said determined minimum reduction ratio decreasing as said sensed engine temperature increases;

means responsive to said desired reduction ratio indicative signal and said minimum reduction ratio indicative signal for generating an output signal indicative of said desired reduction ratio indicative signal when said desired reduction ratio indicative signal is greater than said minimum reduction ratio indicative signal and indicative of said minimum reduction ratio indicative signal when said desired reduction ratio indicative signal is not greater than said minimum reduction ratio indicative signal; and means for adjusting the continuously variable transmission to establish a reduction ratio indicated by said output signal;

wherein said minimum reduction ratio determining means determines the minimum reduction ratio as a maximum reduction ratio achievable in accordance with the construction of the continuously variable transmission when the engine temperature is lower than a first predetermined value, determines the minimum reduction ratio as a minimum value achievable in accordance with the construction of the transmission when the engine temperature is higher than a second predetermined value which is higher than the first predetermined value, and determines the minimum reduction ratio as a reduction ratio which is variable responsive to the engine temperature when the engine temperature is between the first predetermined value and the second predetermined value.

2. A control for controlling a reduction ratio in a continuously variable transmission of a vehicle having an engine drivingly connected to the continuously variable transmission, the control comprising:

means for determining a desired reduction ratio within a predetermined reduction ratio range and generating a desired reduction ratio indicative signal;

sensor means for sensing engine idle speed of the engine and generating a sensor signal indicative of said engine idle speed;

means responsive to said sensor signal for determining a minimum reduction ratio within a minimum reduction ratio range based on possible values of said engine idle speed and generating a minimum reduction ratio indicative signal, said determined minimum reduction ratio increasing as said sensed engine idle speed increases;

means responsive to said desired reduction ratio indicative signal and said minimum reduction ratio indicative signal for generating an output signal indicative of said desired reduction ratio indicative signal when said desired reduction ratio indicative signal is greater than said minimum reduction ratio indicative signal and indicative of said minimum reduction ratio indicative signal when said desired reduction ratio indicative signal is not greater than said minimum reduction ratio indicative signal; and means for adjusting the continuously variable transmission to establish a reduction ratio indicated by said output signal;

wherein said minimum reduction ratio determining means determines the minimum reduction ratio as a minimum reduction ratio achievable in accordance with the construction of the continuously variable transmission when the engine idle speed is lower than a first predetermined value, determines the minimum reduction ratio as a maximum reduction ratio achievable with the construction of the continuously variable transmission when the engine idle speed is higher than a second predetermined value which is higher than the first predetermined value, and determines the minimum reduction ratio as a reduction ratio which is variable responsive to the idle engine speed between the minimum and maximum reduction ratios achievable in accordance with the construction of the continuously variable transmission when the engine idle speed is between the first and second predetermined values.

* * * * *